United States Patent
Filippa et al.

(10) Patent No.: US 9,086,062 B2
(45) Date of Patent: *Jul. 21, 2015

(54) LINEAR COMPRESSOR WITH AN ELECTRO-MAGNETIC SPRING

(75) Inventors: Mariano Pablo Filippa, Louisville, KY (US); Thomas R. Barito, Louisville, KY (US); Gregory William Hahn, Mt. Washington, KY (US); Srinivas Mallampalli, Louisville, KY (US)

(73) Assignee: General Electric Company, Schenectady, NY (US)

(*) Notice: Subject to any disclaimer, the term of this patent is extended or adjusted under 35 U.S.C. 154(b) by 184 days.

This patent is subject to a terminal disclaimer.

(21) Appl. No.: 13/614,778

(22) Filed: Sep. 13, 2012

(65) Prior Publication Data

US 2014/0072462 A1    Mar. 13, 2014

(51) Int. Cl.
F04B 17/04    (2006.01)
H02K 33/00    (2006.01)
F04B 35/04    (2006.01)
F04B 39/00    (2006.01)
H02K 33/16    (2006.01)
H02K 7/14    (2006.01)

(52) U.S. Cl.
CPC ........... *F04B 35/045* (2013.01); *F04B 39/0005* (2013.01); *H02K 7/14* (2013.01); *H02K 33/16* (2013.01)

(58) Field of Classification Search
CPC ....... H02K 33/00; H02K 33/12; H02K 33/16; H02K 33/33; H02K 7/14; F04B 35/045; F04B 39/0005

USPC ......... 417/415, 417; 310/12.19, 12.24, 12.31, 310/14, 15, 20, 17

See application file for complete search history.

(56) References Cited

U.S. PATENT DOCUMENTS

| | | | | |
|---|---|---|---|---|
| 5,017,819 | A | * | 5/1991 | Patt et al. ..................... 310/90.5 |
| 5,148,066 | A | * | 9/1992 | Beale et al. ..................... 310/17 |
| 6,326,706 | B1 | * | 12/2001 | Zhang ......................... 310/12.31 |
| 8,714,946 | B2 | * | 5/2014 | Barito et al. ................... 417/417 |
| 2011/0056235 | A1 | | 3/2011 | Hoshino et al. | |

FOREIGN PATENT DOCUMENTS

EP          0967022 A1    12/1999
EP          2402607 A2    1/2012
WO    WO 2011/137501 A2    11/2011

OTHER PUBLICATIONS

HiblowUSA, Working principle of Linear Pumps, http://www.hiblow-usa.com/?module=Page&sID=working-principle-of-linear-pumps, Apr. 3, 2012.*
International search report issued in connection with PCT/US2013/055936, issued Nov. 19, 2013.

* cited by examiner

*Primary Examiner* — Devon Kramer
*Assistant Examiner* — Nathan Zollinger
(74) *Attorney, Agent, or Firm* — Dority & Manning, P.A.

(57) ABSTRACT

A linear compressor is provided. The linear compressor includes a casing that defines a chamber and a piston slidably received within the chamber of the casing. A driving coil is configured for selectively urging the piston to slide within the chamber of the casing. An electro-magnetic spring is configured for urging the piston towards a default position when the piston is positioned away from the default position. The electro-magnetic spring can permit the linear compressor to operate at a resonant condition.

16 Claims, 10 Drawing Sheets

LINEAR COMPRESSOR WITH AN ELECTRO-MAGNETIC SPRING

FIELD OF THE INVENTION

The present subject matter relates generally to linear compressors, e.g., for refrigerator appliances.

BACKGROUND OF THE INVENTION

Refrigerator appliances generally include a compressor. During operation of the refrigerator appliance, the compressor operates to provide compressed refrigerant. The refrigerator appliance utilizes such compressed refrigerant to cool a compartment of the appliance and food items located therein.

Certain refrigerator appliances include a reciprocating compressor that compresses refrigerant by sliding a piston within a chamber. Reciprocating compressors can include a piston mounted to a crankshaft. As the crankshaft turns, the piston slides within the chamber in order to compress refrigerant. However, the large number of moving parts associated with the piston and crankshaft can generate relatively large friction forces. Such friction can result in poor efficiency and negatively affect performance of the refrigerator appliance.

Recently, linear compressors have been used to compress refrigerant in refrigerator appliances. Linear compressors can include a piston and a driving coil. The driving coil receives a current in order to generate a force that slides the piston backward and forwards within a chamber to compress refrigerant. However, such linear compressors can require active control for every piston stroke in order to stop motion of the piston at either end of the piston's displacement. Such control can be complex, expensive, and inefficient.

In certain linear compressors, the piston is mounted to a spring that urges the piston towards a default position. In such a configuration, the piston oscillates from the default position with an amplitude that depends on the magnitude and frequency of force applied by the driving coil to the piston. By adjusting the strength of the driving coil's force and the frequency of application of such force, the piston can slide within the chamber at a resonant frequency in which the amplitude of the piston's displacement can be maximized for the force applied to the piston. However, using such mechanical springs can be inefficient because such mechanical springs have fixed spring constants.

Accordingly, a linear compressor with features for operating at a resonant condition would be useful. In particular, a linear compressor with features for operating at a resonant condition without mechanical springs would be useful. Further, a linear compressor with features for operating at a resonant condition without complex controls would be useful.

BRIEF DESCRIPTION OF THE INVENTION

The present subject matter relates to a linear compressor. The linear compressor includes a casing that defines a chamber and a piston slidably received within the chamber of the casing. A driving coil is configured for selectively urging the piston to slide within the chamber of the casing. An electro-magnetic spring is configured for urging the piston towards a default position when the piston is positioned away from the default position. The electro-magnetic spring can permit the linear compressor to operate at a resonant condition. Additional aspects and advantages of the invention will be set forth in part in the following description, or may be apparent from the description, or may be learned through practice of the invention.

In a first exemplary embodiment, a linear compressor is provided. The linear compressor defines an axial direction and a radial direction. The linear compressor includes a casing that defines a chamber. The chamber of the casing extends longitudinally along the axial direction. A piston assembly has a piston head. The piston head of the piston assembly is slidably received within the chamber of the casing. The piston assembly is slidable along the axial direction from a default position. A driving coil is positioned proximate the piston assembly. The driving coil is configured for selectively urging the piston assembly to slide along the axial direction. At least one spring magnet is mounted to the piston assembly. An electro-magnetic spring includes at least one ferromagnetic tooth. Each ferromagnetic tooth of the at least one ferromagnetic tooth is positioned proximate a respective one of the at least one spring magnet. The electro-magnetic spring urges the piston assembly towards about the default position when the piston assembly is positioned away from the default position.

In a second exemplary embodiment, a linear compressor is provided. The linear compressor defines an axial direction and a radial direction. The linear compressor includes a casing that defines a chamber. The chamber of the casing extends longitudinally along the axial direction. A piston assembly has a piston head. The piston head of the piston assembly is slidably received within the chamber of the casing. The piston assembly is slidable along the axial direction from a default position. A driving coil is positioned proximate the piston assembly. The driving coil is configured for selectively urging the piston assembly to slide along the axial direction. At least one spring magnet is mounted to the casing. An electro-magnetic spring is mounted to the piston assembly. The electro-magnetic spring includes at least one ferromagnetic tooth. Each ferromagnetic tooth of the at least one ferromagnetic tooth is positioned proximate a respective one of the at least one spring magnet. The electro-magnetic spring urges the piston assembly towards about the default position when the piston assembly is positioned away from the default position.

In a third exemplary embodiment, a linear compressor is provided. The linear compressor defines an axial direction. The linear compressor includes a casing that defines a chamber. The chamber of the casing extends longitudinally along the axial direction. A piston assembly has a piston head. The piston head of the piston assembly is slidably received within the chamber of the casing. The piston assembly is slidable along the axial direction from a default position. A driving coil is positioned proximate the piston assembly. The driving coil is configured for selectively urging the piston assembly to slide along the axial direction. The linear compressor also includes means for urging the piston assembly towards about the default position when the piston assembly is positioned away from the default position.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 3 is a schematic view of the linear compressor of FIG. 2 according to an exemplary embodiment of the present subject matter. FIG. 3 also shows a driving coil according to an exemplary embodiment of the present subject matter and an electro-magnetic spring according to an exemplary embodiment of the present subject matter.

FIGS. 4 and 5 are schematic views of the driving coil and the electro-magnetic spring of FIG. 3, respectively. In FIGS. 4 and 5, the driving coil and electro-magnetic spring are shown in a first extended position.

In FIGS. 6 and 7, the driving coil and electro-magnetic spring are shown in a default position.

FIGS. 8 and 9 are schematic views of the driving coil and the electro-magnetic spring of FIG. 3, respectively. In FIGS. 8 and 9, the driving coil and electro-magnetic spring are shown in a second extended position.

FIGS. 12-14 provide partial sectional views of a linear compressor according to an exemplary embodiment of the present subject matter. In FIG. 12, a piston assembly of the linear compressor is shown in a top dead center position. In FIG. 13, the piston assembly of the linear compressor is shown in a default position. In FIG. 14, the piston assembly of the linear compressor is shown in a bottom dead center position.

FIG. 15 provides a partial sectional view of a linear compressor according to an additional exemplary embodiment of the present subject matter. In FIG. 15, the linear compressor includes spring coils.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
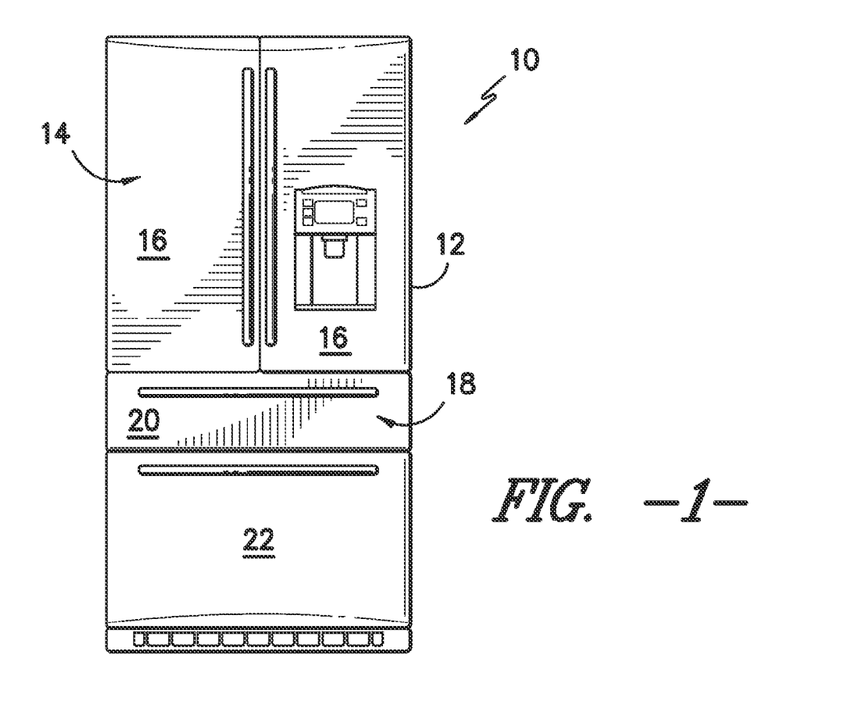
FIG. 1 is a front view of a refrigerator appliance according to an exemplary embodiment of the present subject matter.
Figure 2:
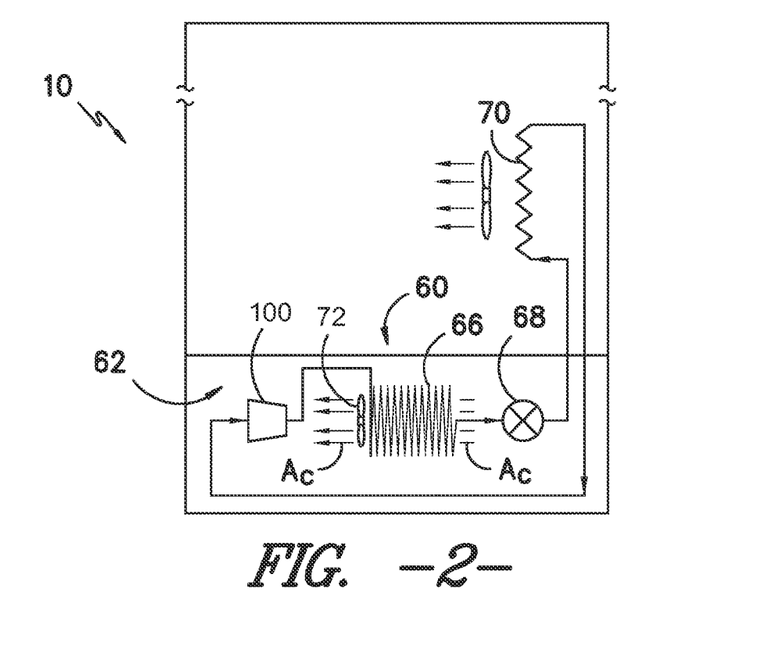
FIG. 2 is schematic view of a refrigeration system of the refrigerator appliance of FIG. 1. The refrigeration system includes a linear compressor.

FIG. 1 depicts a refrigerator appliance 10 that incorporates a sealed refrigeration system 60 (FIG. 2). It should be appreciated that the term "refrigerator appliance" is used in a generic sense herein to encompass any manner of refrigeration appliance, such as a freezer, refrigerator/freezer combination, and any style or model of conventional refrigerator. In addition, it should be understood that the present subject matter is not limited to use in appliances. Thus, the present subject matter may be used for any other suitable purpose such as vapor compression within air conditioning units or air compression within air compressors.

In the illustrated exemplary embodiment shown in FIG. 1, the refrigerator appliance 10 is depicted as an upright refrigerator having a cabinet or casing 12 that defines a number of internal storage compartments. In particular, refrigerator appliance 10 includes upper fresh-food compartments 14 having doors 16 and lower freezer compartment 18 having upper drawer 20 and lower drawer 22. The drawers 20, 22 are "pull-out" drawers in that they can be manually moved into and out of the freezer compartment 18 on suitable slide mechanisms.

FIG. 2 is a schematic view of refrigerator appliance 10 including an exemplary sealed refrigeration system 60. A machinery compartment 62 contains components for executing a known vapor compression cycle for cooling air. The components include a linear compressor 100, a condenser 66, an expansion device 68, and an evaporator 70 connected in series and charged with a refrigerant. Linear compressor 100 is discussed in greater detail below. As will be understood by those skilled in the art, refrigeration system 60 may include additional components, e.g., at least one additional evaporator, compressor, expansion device, and/or condenser. As an example, refrigeration system 60 may include two evaporators.

Within refrigeration system 60, gaseous refrigerant flows into linear compressor 100, which operates to increase the pressure of the refrigerant. This compression of the refrigerant raises its temperature, which is lowered by passing the gaseous refrigerant through condenser 66. Within condenser 66, heat exchange with ambient air takes place so as to cool the refrigerant and cause the refrigerant to condense to a liquid state. A fan 72 is used to pull air across condenser 66, as illustrated by arrows $A_C$, so as to provide forced convection for a more rapid and efficient heat exchange between the refrigerant within condenser 66 and the ambient air. Thus, as will be understood by those skilled in the art, increasing air flow across condenser 66 can, e.g., increase the efficiency of condenser 66 by improving cooling of the refrigerant contained therein.

An expansion device (e.g., a valve, capillary tube, or other restriction device) 68 receives liquid refrigerant from condenser 66. From expansion device 68, the liquid refrigerant enters evaporator 70. Upon exiting expansion device 68 and entering evaporator 70, the liquid refrigerant drops in pressure and vaporizes. Due to the pressure drop and phase change of the refrigerant, evaporator 70 is cool relative to compartments 14, 18 of refrigerator appliance 10. As such, cooled air is produced and refrigerates compartments 14, 18 of refrigerator appliance 10. Thus, evaporator 70 is a type of heat exchanger which transfers heat from air passing over evaporator 70 to refrigerant flowing through evaporator 70.

Collectively, the vapor compression cycle components in a refrigeration circuit, associated fans, and associated compartments are sometimes referred to as a sealed refrigeration system operable to force cold air through refrigeration compartments 14, 18 (FIG. 1). The refrigeration system 60 depicted in FIG. 2 is provided by way of example only. Thus, it is within the scope of the present subject matter for other configurations of the refrigeration system to be used as well.

Figure 3:
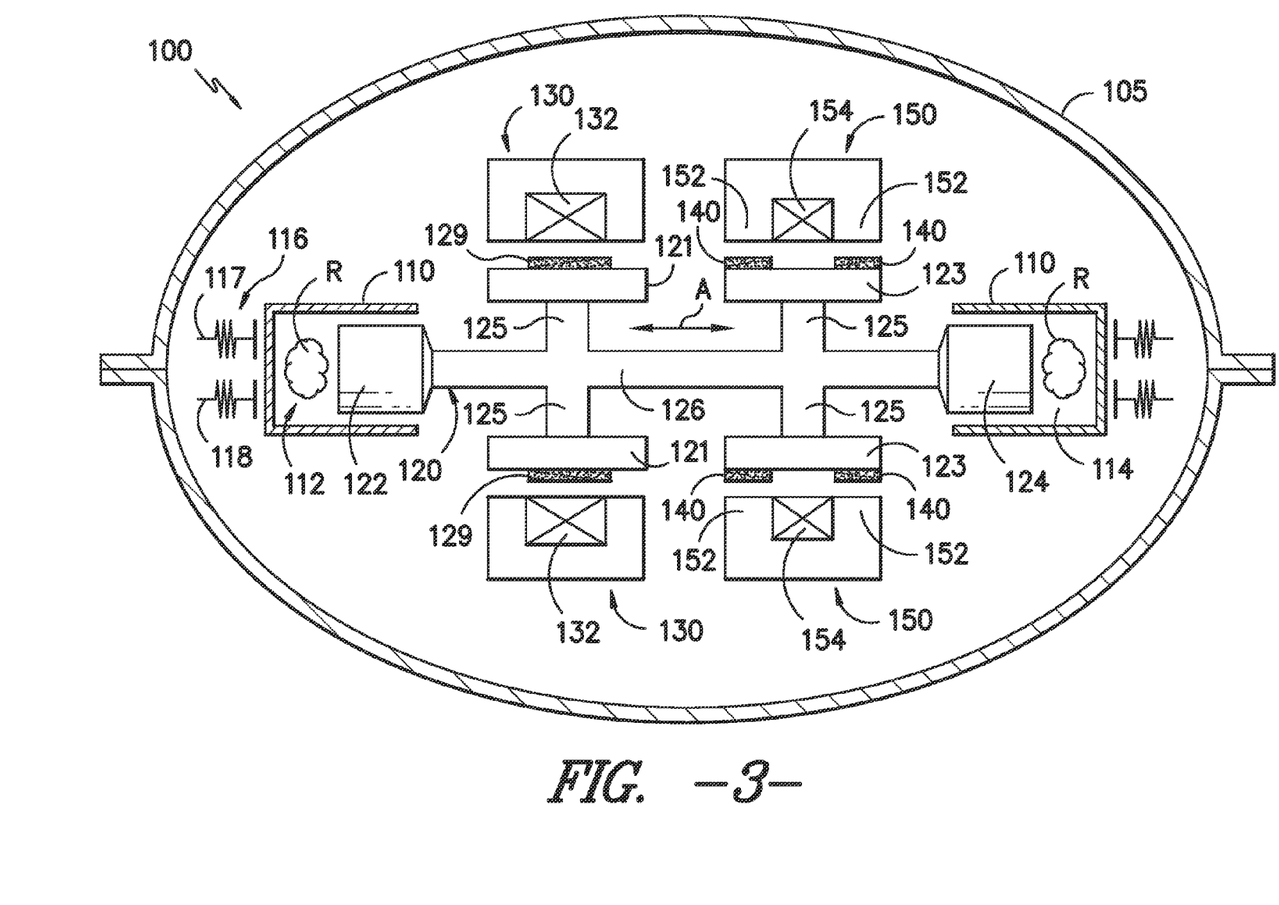

FIG. 3 is a schematic view of linear compressor 100 according to an exemplary embodiment of the present subject matter. As may be seen in FIG. 3, linear compressor 100 is enclosed in a hermetic or air-tight shell 105. Hermetic shell 105 can, e.g., hinder or prevent refrigerant from leaking or escaping from refrigeration system 60 (FIG. 2) at linear compressor 100.

Linear compressor 100 includes a casing 110 and also defines an axial direction A. Casing 110 defines a chamber 112 that extends longitudinally along the axial direction A. Casing 110 further includes valves 116 that permit refrigerant (shown as R) to enter and exit chamber 112 during compression of refrigerant R by linear compressor 100.

A piston assembly 120 with a piston head 122 is slidably received within chamber 112 of casing 110. In particular, piston head 122 is slidable along the axial direction within chamber 112. During sliding of piston head 122 within chamber 112, piston head 122 compresses refrigerant R within chamber 112. Piston head 122 can slide between a default position, a top dead center position, and a bottom dead center position within chamber 112 as will be understood by those skilled in the art.

As an example, from the top dead center position, piston head 122 can slide within chamber 112 towards the bottom dead center position along the axial direction, i.e., an expansion stroke of piston head 122. During the expansion stroke of piston head 122, an expansion valve 117 of valves 116 permits refrigerant R to enter chamber 112 through expansion valve 117. When piston head 122 reaches the bottom dead center position, piston head 122 changes directions and slides in chamber 112 back towards the top dead center position, i.e., a compression stroke of piston head 122. During the compression stroke of piston head 122, refrigerant R that enters chamber 112 during the expansion stroke is compressed until refrigerant R reaches a particular pressure and such compressed refrigerant R exits chamber 112 through a compression valve 118 of valves 116. In such a manner, refrigerant R is compressed within chamber 112 by piston head 122.

In the exemplary embodiment shown in FIG. 3, piston assembly 120 includes an additional piston head 124 slidably received within an additional chamber 114 defined by casing 110. Additional piston head 124 is slidable along the axial direction within additional chamber 114. During sliding of additional piston head 124 within additional chamber 114, additional piston head 124 compresses refrigerant within additional chamber 114, e.g., in the same manner described above for piston head 122 within chamber 112. However, it should be understood that linear compressor 100 need not include additional piston head 124 or additional chamber 114. Thus, linear compressor 100 may have only a single piston head rather than two piston heads as shown in FIG. 3. Other suitable configurations are available as well, e.g., one, two, three, or more additional piston heads.

Piston head 122 and additional piston head 124 are coupled together with a shaft 126. Thus, shaft 126 extends between and connects piston head 122 and additional piston head 124 such that piston head 122 and additional piston head 124 simultaneously slide within chamber 112 and additional chamber 114, respectively.

Piston assembly 120 also includes a first flange 121 and a second flange 123. First flange 121 is spaced apart from second flange 123 along the axial direction A. First and second flanges 121 and 123 are also radially spaced apart from shaft 126 and extend circumferentially about shaft 126 as will be understood by those skilled in the art. Brackets 125 extend between and connect first and second flanges 121 and 123 and shaft 126, respectively.

At least one driving magnet 129, e.g., one, two, three, or more driving magnets, is mounted to first flange 121. Similarly, at least one spring magnet 140, e.g., one, two, three, four, or more spring magnets, is mounted to second flange 123. In FIG. 3, linear compressor 100 includes two spring magnets 140. However, in alternative exemplary embodiments, linear compressor 100 may include any suitable number of spring magnets 140 as discussed above. Driving magnet 129 is spaced apart from spring magnets 140, e.g., along the axial direction A. Driving magnet 129 and spring magnets 140 extend circumferentially about shaft 126 on first and second flanges 121 and 123, respectively.

Linear compressor 100 further includes a motor 130 with at least one driving coil 132. Driving coil 132 is positioned proximate first flange 121 of piston assembly 120. Driving coil 132 is configured for selectively urging piston head 122 and additional piston head 124 to slide along the axial direction A within chamber 112 and additional chamber 114, respectively. In particular, driving coil 132 receives a current from a current source 160 (FIG. 3) in order to generate a magnetic field that engages driving magnet 129 and urges piston assembly 120 to move along the axial direction A in order to compress refrigerant R within chamber 112 and additional chamber 114 as described above and will be understood by those skilled in the art. In particular, driving coil 132 can slide piston assembly 120 between the top dead center position and the bottom dead center position.

Figure 4:
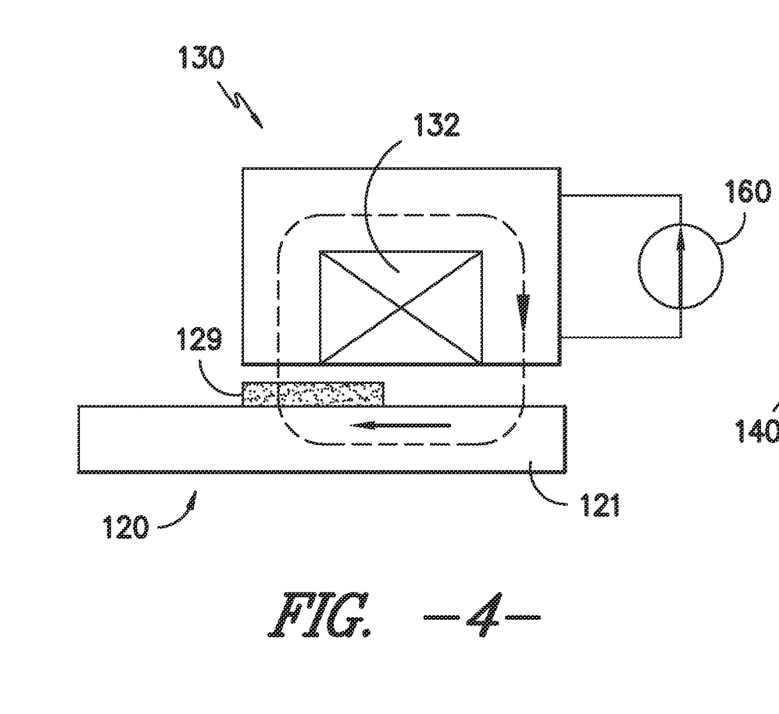
Figure 8:
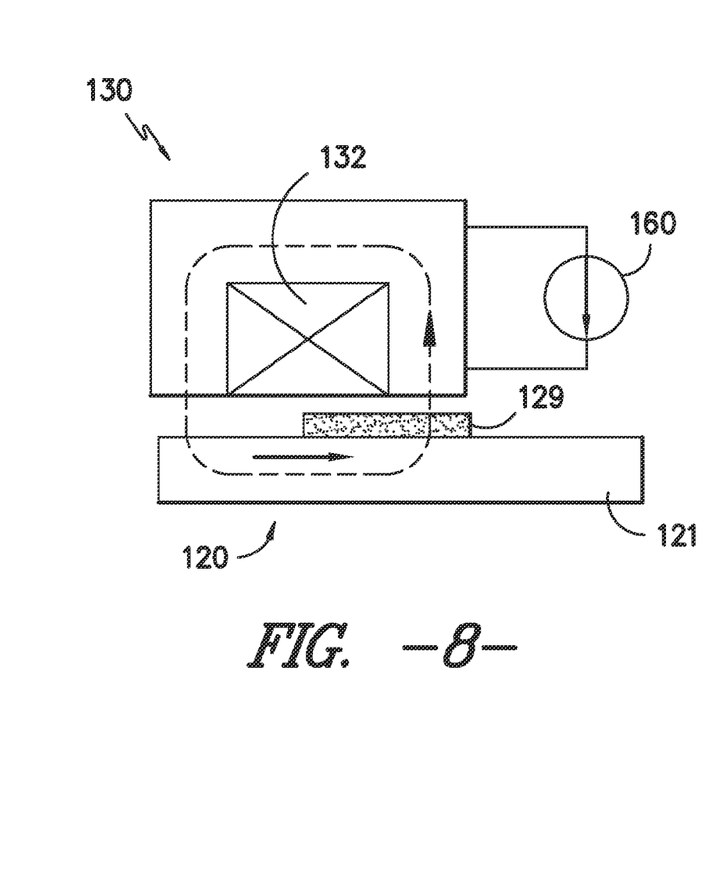

FIGS. 4 and 8 illustrate driving coil 132 receiving a current from current source 160 in order to move piston assembly 120 along the axial direction A. In particular, driving coil 132 receives a positive current from current source 160 in FIG. 4 and a negative current from current source 160 in FIG. 8. Driving coil 132 urges piston assembly 120 in a first direction (e.g., towards the top dead center position) when driving coil 132 receives the positive current as shown in FIG. 4. Conversely, driving coil 132 urges piston assembly 120 in a second direction that is opposite to the first direction (e.g., towards the bottom dead center position) when driving coil 132 receives the negative current as shown in FIG. 8. As will be understood by those skilled in the art and discussed in greater detail below, movement of piston assembly 120 can be controlled by adjusting the magnitude of the current from current source 160, the direction of the current from current source 160, and the frequency that current is applied to driving coil 132 by current source 160.

The magnitude, direction, and frequency of current supplied to driving coil 160 and/or spring coil 154 (described below) can be regulated or controlled with a processing device or controller (not shown). The controller may include a memory and microprocessor, such as a general or special purpose microprocessor operable to execute programming instructions or micro-control code associated with operation of the refrigerator appliance 10. The memory may represent random access memory such as DRAM, or read only memory such as ROM or FLASH. In one embodiment, the processor executes programming instructions stored in memory. The memory may be a separate component from the processor or may be included onboard within the processor.

Turning back to FIG. 3, linear compressor 100 also includes an electro-magnetic spring 150. Electro-magnetic spring 150 is positioned proximate spring magnets 140 and second flange 123 of piston assembly 120. In particular, electro-magnetic spring 150 includes at least one ferromagnetic tooth 152, e.g., one, two, three, four, or more ferromagnetic teeth. In FIG. 3, electro-magnetic spring 150 includes two ferromagnetic teeth 152. However, in alternative exemplary embodiments, electro-magnetic spring 150 may include any suitable number of ferromagnetic teeth as discussed above. Each ferromagnetic tooth of ferromagnetic teeth 152 is positioned proximate a respective one of the spring magnets 140.

Ferromagnetic teeth 152 may include any suitable ferromagnetic material, e.g., iron, or combination of ferromagnetic materials and/or non-ferromagnetic materials. Electro-magnetic spring 150 is configured for urging piston assembly 120 towards the default position when piston assembly 120 is positioned away from the default position.

Figure 5:
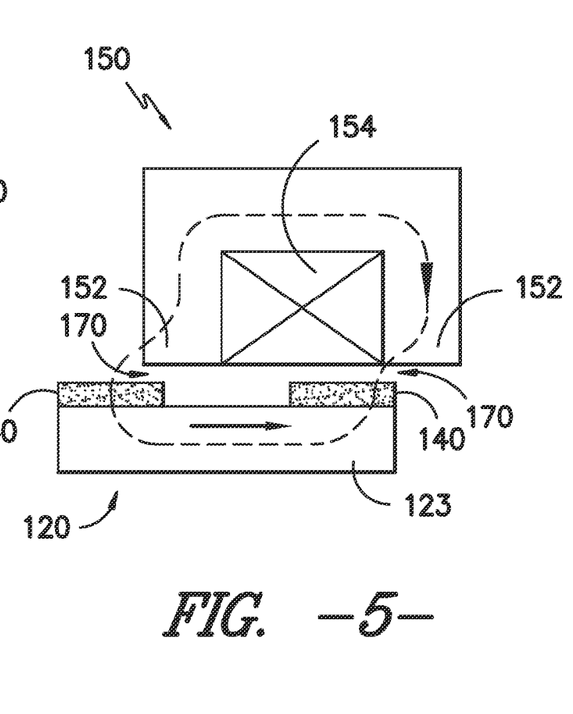
Figure 9:
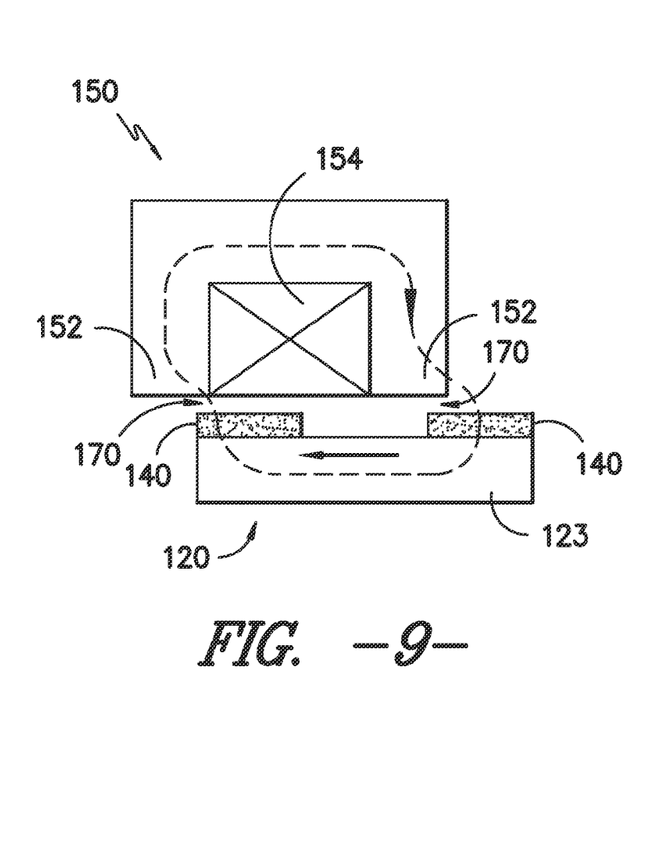

FIGS. 5 and 9 illustrate electro-magnetic spring 150 urging piston assembly 120 towards the default position along the axial direction A. In particular, electro-magnetic spring 150 urges piston assembly 120 towards the default position from the top dead center position along the axial direction A as shown in FIG. 5 and towards the default position from the bottom dead center position along the axial direction A in FIG. 9. Thus, when driving coil 132 urges piston assembly 120 in the first direction (e.g., towards the top dead center position) as shown in FIG. 4, electro-magnetic spring 150 urges piston assembly 120 towards the default position as shown in FIG. 5. Conversely, when driving coil 132 urges piston assembly 120 in the second direction (e.g., towards the bottom dead center position) as shown in FIG. 8, electro-magnetic spring 150 urges piston assembly 120 towards the default position as shown in FIG. 9. Thus, as discussed above, electro-magnetic spring 150 urges piston assembly 120 towards about the default position when piston assembly 120 is positioned away from the default position.

Figure 6:
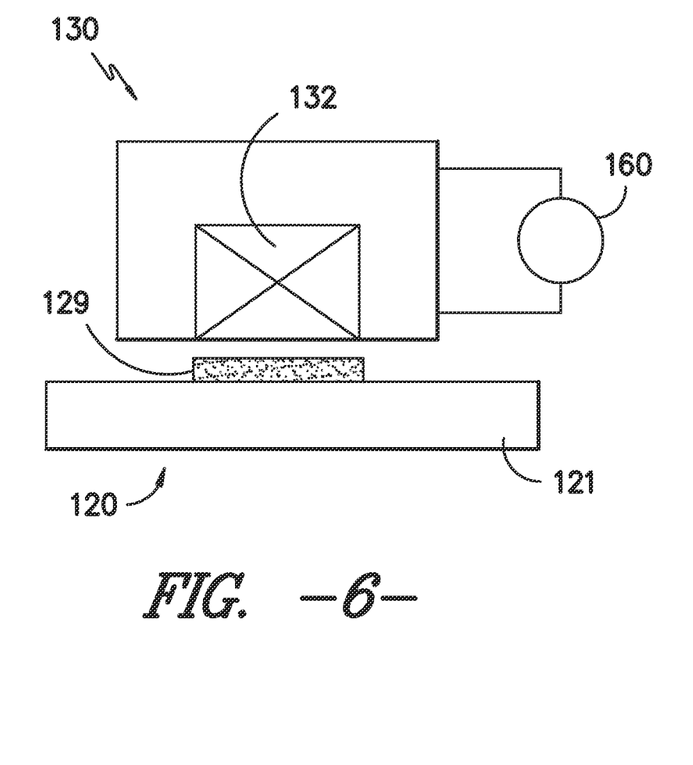
FIGS. 6 and 7 are schematic views of the driving coil and the electro-magnetic spring of FIG. 3, respectively.
Figure 7:
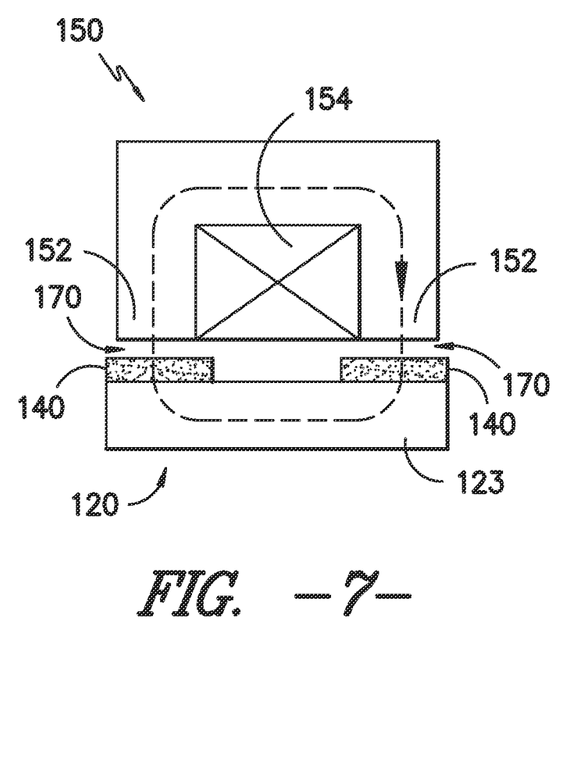

FIG. 7 illustrates electro-magnetic spring 150 positioning piston assembly 120 at about the default position. As may be seen in FIG. 7, each ferromagnetic tooth 152 faces (e.g., is radially aligned with) a respective one of the spring magnets 140 when piston assembly 120 is positioned in about the default position. Electro-magnetic spring 150 positions piston assembly 120 at about the default position as shown in FIG. 7 when substantially no current (e.g., about zero amps) is applied to driving coil 132 by current source 160 as shown in FIG. 6. Thus, the default position may be an equilibrium position for piston assembly 120 due to electro-magnetic spring 150. Accordingly, driving coil 132 can selectively urge piston assembly 120 away from the equilibrium position, and electro-magnetic spring 150 will urge piston assembly 120 towards the equilibrium position as discussed in greater detail below.

Figure 10:
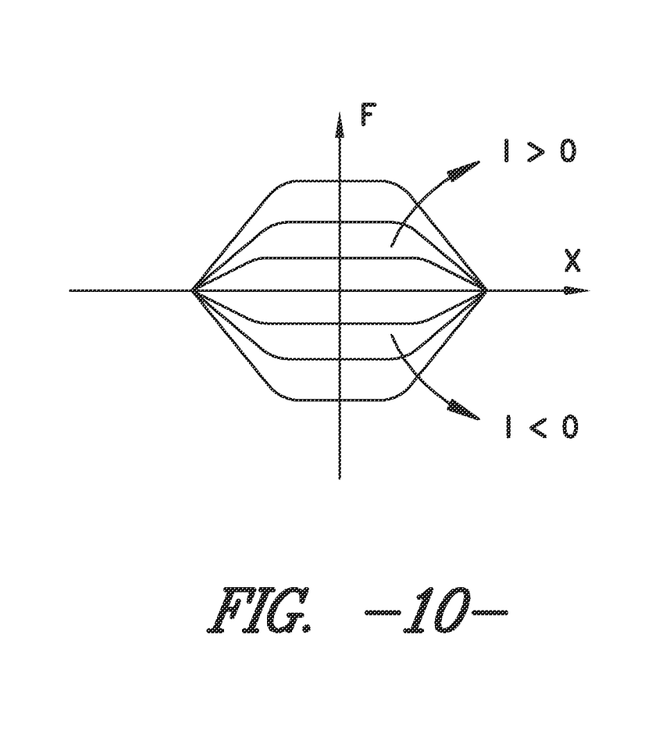
FIG. 10 illustrates graphs of the force applied by the driving coil to a piston assembly of the compressor versus the position of the piston assembly for various currents flowing through the driving coil.

FIG. 10 illustrates graphs of the force applied by driving coil 132 to piston assembly 120 versus the position of piston assembly 120 for various currents supplied to driving coil 132 by current source 160. As may be seen in FIG. 10, the force applied to piston assembly 120 by driving coil 132 is positively correlated with the current supplied to driving coil 132 by current source 160, i.e., the force applied to piston assembly 120 by driving coil 132 increases as the magnitude of current supplied to driving coil 132 by current source 160 increases. In addition, the direction of the force applied to piston assembly 120 by driving coil 132 changes direction when the current supplied to driving coil 132 by current source 160 changes between positive and negative.

In particular, driving coil 132 applies a positive force to piston assembly 120 when driving coil 132 receives a positive current, e.g., from current supply 160, and the magnitude of the positive force applied by driving coil 132 to piston assembly 120 increases as the magnitude of the positive current increases. Conversely, driving coil 132 applies a negative force to piston assembly 120 when driving coil 132 receives a negative current, e.g., from current supply 160, and the magnitude of the negative force applied by driving coil 132 to piston assembly 120 increases as the magnitude of the negative current increases.

Turning back to FIG. 3, electro-magnetic spring 150 also includes a spring coil 154. Spring coil 154 is positioned between two teeth of the ferromagnetic teeth 152 along the axial direction A and is also positioned adjacent two magnets of the spring magnets 140. Spring coil 154 can receive a current, e.g., from current source 160, to adjust electro-magnetic spring 150 as discussed in greater detail below.

Figure 11:
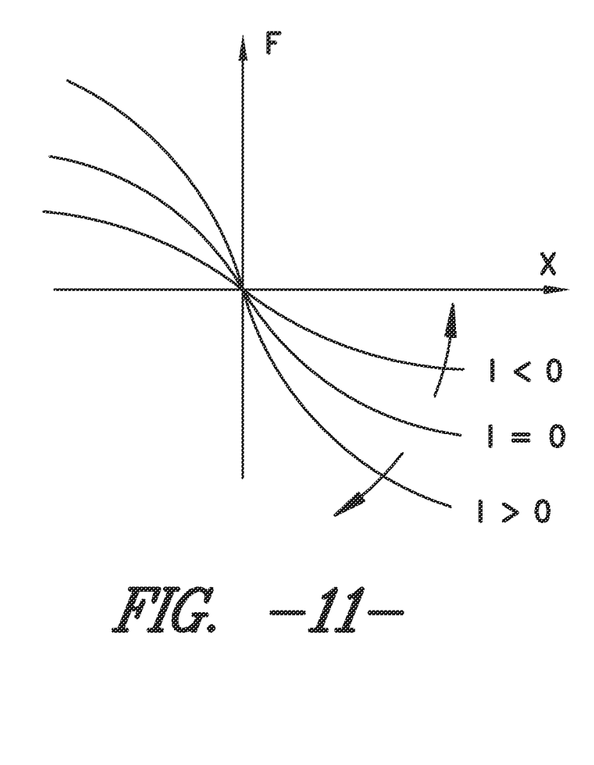
FIG. 11 illustrates graphs of the force applied by the electro-magnetic spring to the piston assembly versus the position of the piston assembly for various currents flowing through a spring coil.

FIG. 11 illustrates graphs of the force applied by electro-magnetic spring 150 to piston assembly 120 versus the position of piston assembly 120 for various currents flowing through a spring coil 154 of electro-magnetic spring 150. As may be seen in FIG. 11, the force applied to piston assembly 120 by electro-magnetic spring 150 is zero when piston assembly 120 is located at the default position (when x=0 in FIG. 11). On the other hand, the force applied to piston assembly 120 by electro-magnetic spring 150 is positive when piston assembly 120 is located between the top dead center position and the default position (when x is negative in FIG. 11), and the force applied to piston assembly 120 by electro-magnetic spring 150 is negative when piston assembly 120 is located between the bottom dead center position and the default position (when x is positive in FIG. 11).

By controlling the forces applied to piston assembly 120 by driving coil 132 and electro-magnetic spring 150, piston assembly 120 can be driven at a resonant frequency. In particular, as will be understood by those skilled in the art, piston assembly 120 can be driven at the resonant frequency by controlling the magnitude of force applied to piston assembly 120 and the frequency that such force is applied to piston assembly 120.

Thus, as an example, when driving coil 132 applies a positive force to piston assembly 120 and urges piston assembly 120 to the top dead center position as shown in FIG. 4, electro-magnetic spring 150 applies a negative force to piston assembly 120 and urges piston assembly 120 towards the default position as shown in FIG. 5. Conversely, when driving coil 132 applies a negative force to piston assembly 120 and urges piston assembly 120 to the bottom dead center position as shown in FIG. 8, electro-magnetic spring 150 applies a positive force to piston assembly 120 and urges piston assembly 120 towards the default position as shown in FIG. 9. Utilizing electro-magnetic spring 150 and driving coil 132, piston assembly 120 can be driven at the resonant frequency to permit periodic driving forces applied by driving coil 142 to piston assembly 120 to produce large amplitude oscillations of piston assembly 120 and piston head 122 within chamber 112 as will be understood by those skilled in the art.

In addition, spring coil 154 can be utilized to adjust the resonant frequency of piston assembly 120. For example, as shown in FIG. 11, by adjusting the magnitude of current flowing through spring coil 154, the force applied by electro-magnetic spring 150 to piston assembly 120 and/or the stiffness of electro-magnetic spring 150 can be increased or decreased. Such changes in force applied by electro-magnetic spring 150 can permit tuning of the resonant frequency, e.g., by tuning the stiffness of electro-magnetic spring 150. In particular, by applying a negative current to spring coil and thereby reducing the force applied by electro-magnetic spring 150 to piston assembly 120 during movement of piston assembly 120 away from the default position, the resonant frequency of the piston assembly 120 can be reduced. Conversely, by applying a positive current to spring coil and thereby increasing the force applied by electro-magnetic spring 150 to piston assembly 120 during movement of piston assembly 120 away from the default position, the resonant frequency of the piston assembly 120 can be increased.

In addition, as may be seen in FIGS. 5, 7, and 9, each ferromagnetic tooth 152 is spaced apart from a respective one of the spring magnets 140 by a gap 170. Gap 170 may be selected in order to adjust the magnitude of the force between ferromagnetic teeth 152 and spring magnets 140. As an example, gap 170 may be about half a millimeter. In alternative exemplary embodiments, any suitable value for gap 170 may be selected to facilitate operation of linear compressor 100.

Figure 12:
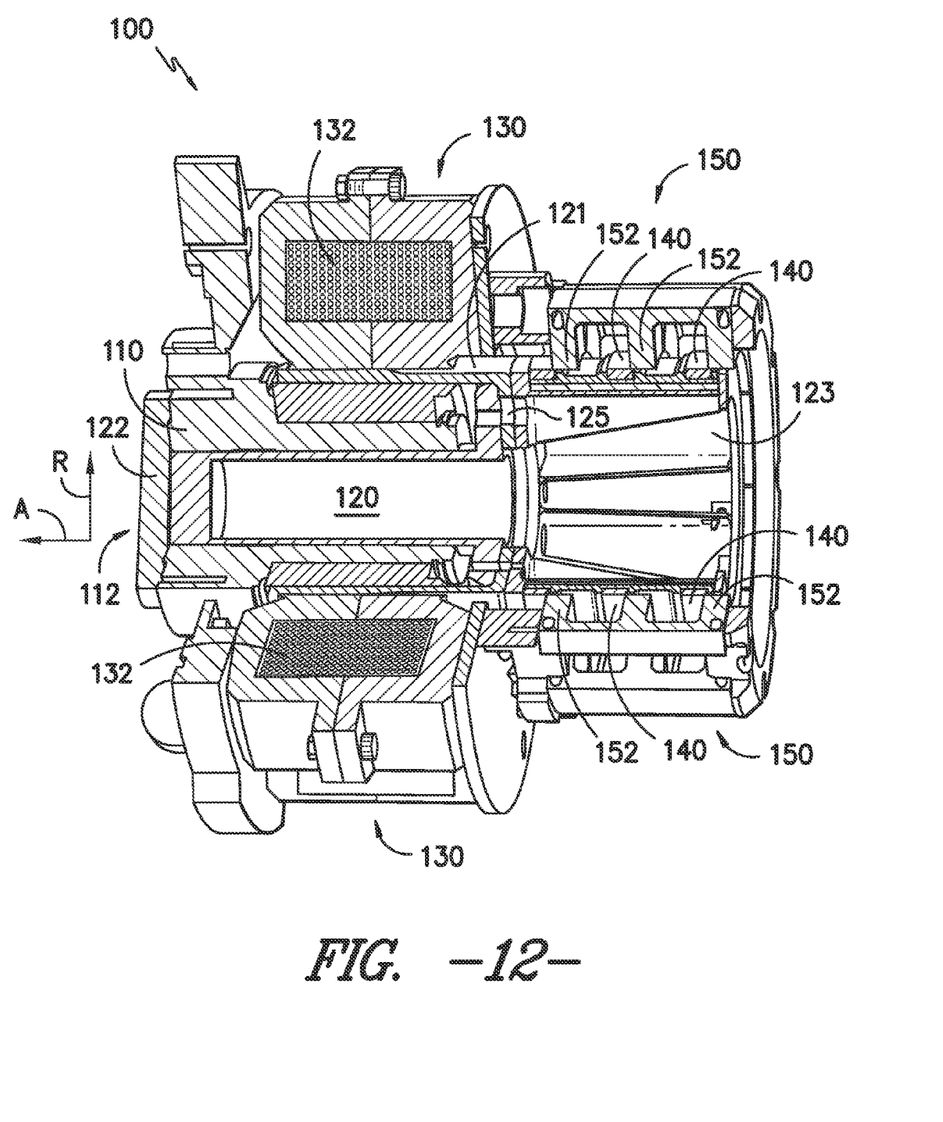
Figure 13:
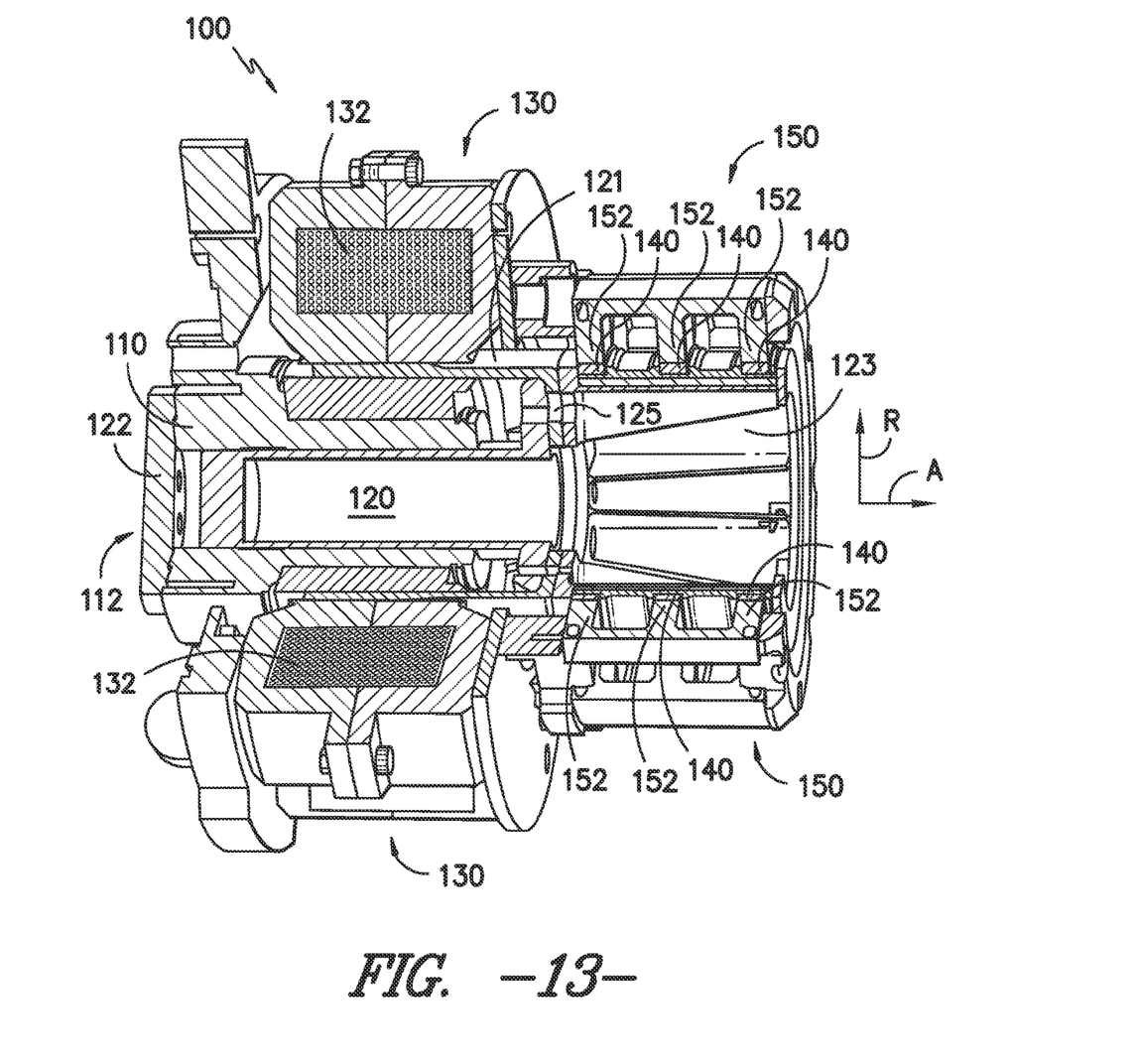
Figure 14:
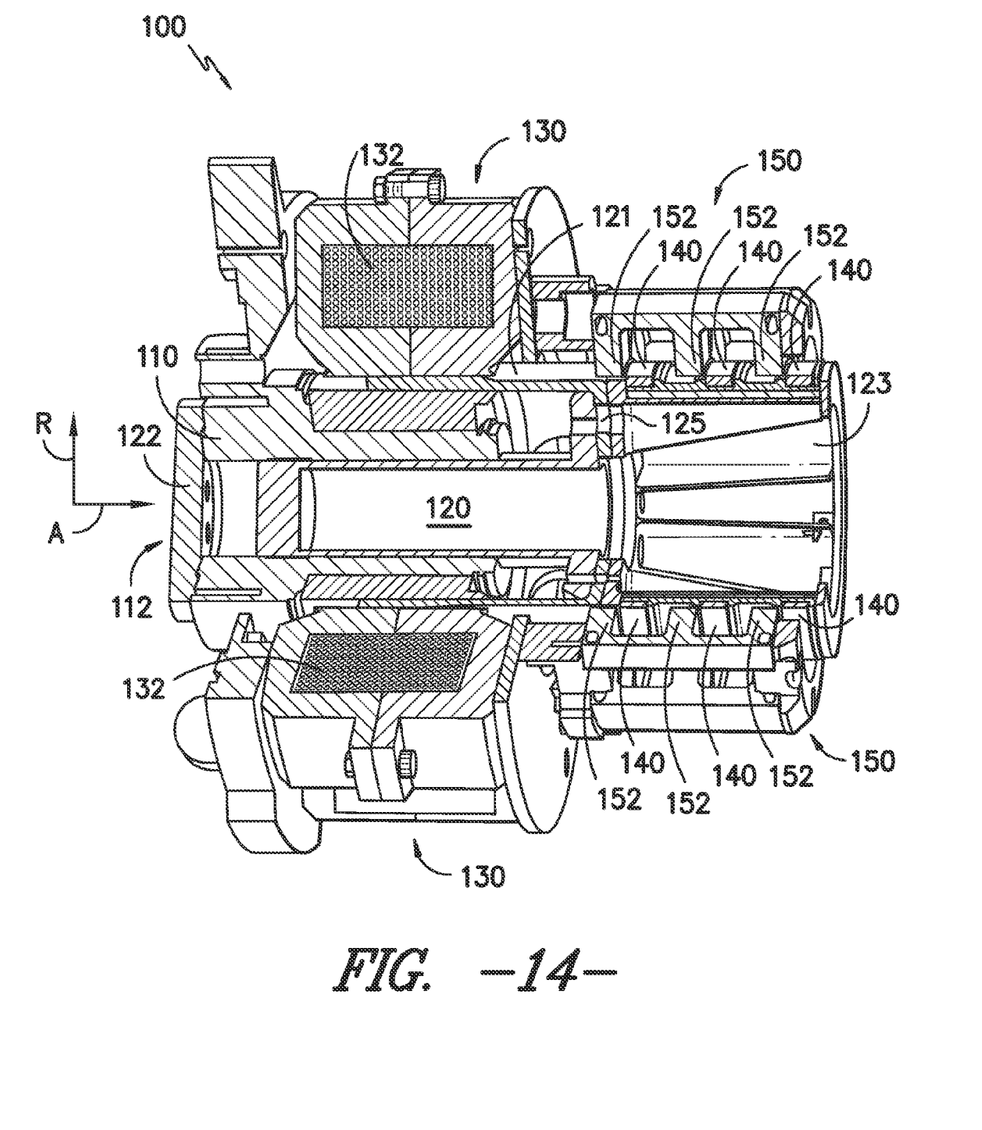

FIGS. 12-14 provide partial sectional views of linear compressor 100 according to an exemplary embodiment of the present subject matter. In FIG. 12, piston assembly 120 of linear compressor 100 is shown in a top dead center position. In FIG. 13, piston assembly 120 is shown in a default position. In FIG. 14, piston assembly 120 is shown in a bottom dead center position. The exemplary embodiment shown in FIGS. 12-14 does not include spring coil 154 (FIG. 3). Thus, electromagnetic spring 150 is passive in the exemplary embodiment shown in FIGS. 12-14.

Also, in the exemplary embodiment shown in FIGS. 12-14, linear compressor 100 includes three spring magnets 140 that are uniformly distributed along the axial direction A. However, in alternative exemplary embodiments, linear compressor 100 may include any suitable number of spring magnets 140, e.g., one, two, four, five, or more. Spring magnets 140 extend circumferentially about second flange 123 of piston assembly 120.

Exemplary ferromagnetic teeth 152 are also shown magnetically engaging spring magnets 140 in FIGS. 12 and 14 in order to urge piston assembly 120 towards the default position shown in FIG. 13. In particular, each ferromagnetic tooth of the ferromagnetic teeth 152 is radially misaligned with a respective one the spring magnets 140 when piston assembly 120 is positioned in the top dead center position as shown in FIG. 12 or the bottom dead center position as shown in FIG. 14. Conversely, each ferromagnetic tooth of the ferromagnetic teeth 152 is radially aligned with a respective one of the spring magnets when piston assembly 120 is positioned in about the default position as shown in FIG. 13.

Figure 15:
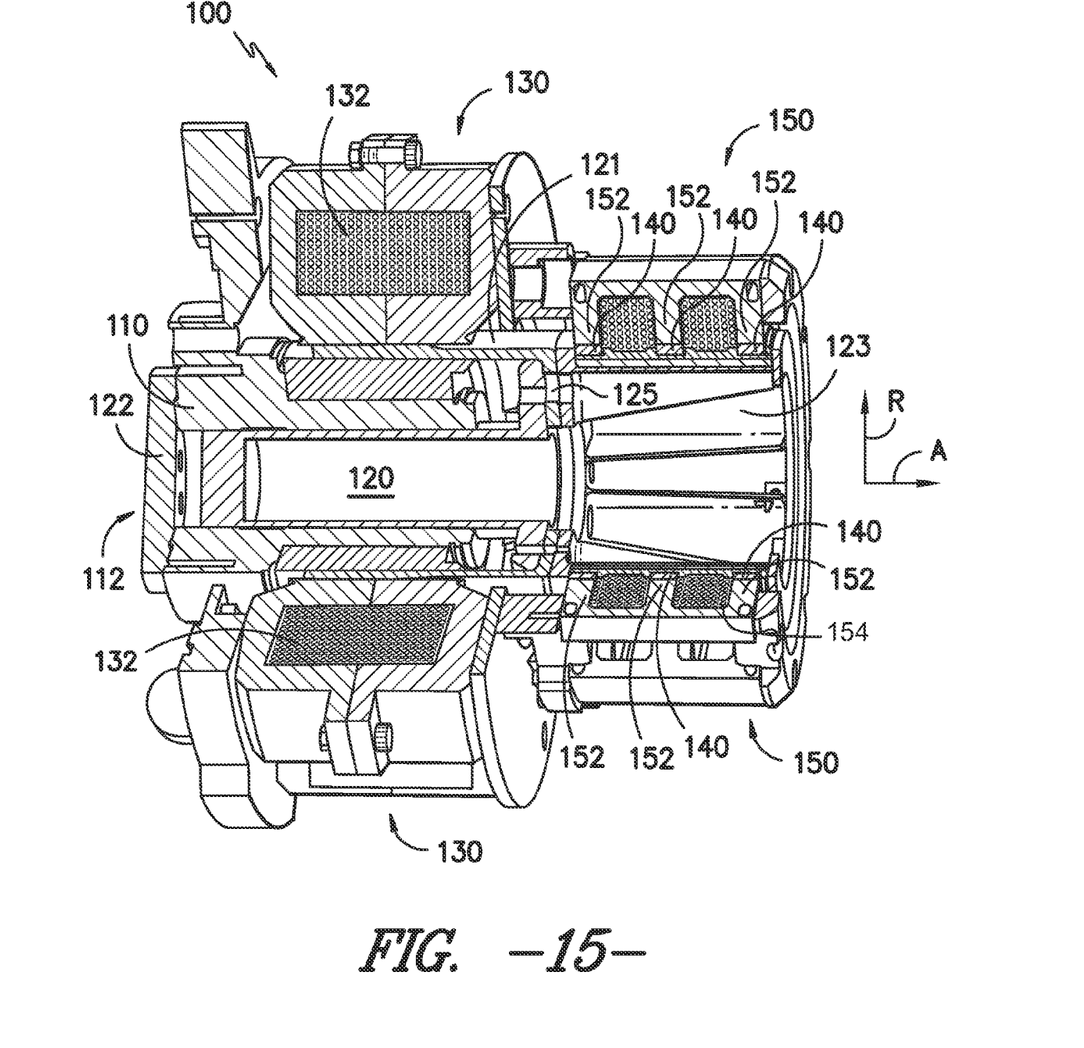

FIG. 15 provides a partial sectional view of linear compressor 100 according to an additional exemplary embodiment of the present subject matter. In FIG. 15, linear compressor 100 includes spring coils 154 mounted between ferromagnetic teeth 152. Thus, electro-magnetic spring 150 may be passive or active in the exemplary embodiment shown in FIG. 15.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A linear compressor, the linear compressor defining an axial direction and a radial direction, the linear compressor comprising:
a casing defining a chamber, the chamber of said casing extending longitudinally along the axial direction;
a piston assembly having a piston head, the piston head of said piston assembly received within the chamber of said casing, said piston assembly slidable along the axial direction from a default position to a top dead center position and a bottom dead center position;
a driving coil positioned proximate said piston assembly, said driving coil configured for selectively urging said piston assembly to slide along the axial direction;
at least three spring magnets mounted to said piston assembly, the spring magnets of said at least three spring magnets spaced apart from one another along the axial direction on said piston assembly; and
an electro-magnetic spring comprising at least three ferromagnetic teeth, each ferromagnetic tooth of the at least three ferromagnetic teeth positioned proximate a respective one of said at least three spring magnets, each ferromagnetic tooth of said at least three ferromagnetic teeth facing and exposed to a respective spring magnet of said at least three spring magnets, said electro-magnetic spring urging said piston assembly towards the default position when said piston assembly is positioned away from the default position, each ferromagnetic tooth of the at least three ferromagnetic teeth radially aligned with the respective one of said at least three spring magnets when said piston assembly is positioned in the default position, each ferromagnetic tooth of the at least three ferromagnetic teeth radially misaligned with the respective one of said at least three spring magnets when said piston assembly is positioned in the top dead center position or the bottom dead center position.

2. The linear compressor of claim 1, wherein said electro-magnetic spring further comprises a spring coil positioned adjacent a ferromagnetic tooth of said at least three ferromagnetic teeth.

3. The linear compressor of claim 2, wherein the spring coil is configured for receiving an electrical current and adjusting a resonant frequency of said piston assembly.

4. The linear compressor of claim 1, wherein each magnet of said at least three spring magnets generates a magnetic field that engages a respective one of the at least three ferromagnetic teeth and urges said piston assembly towards the default position when said piston assembly is positioned away from the default position.

5. The linear compressor of claim 1, wherein said casing defines an additional chamber that extends along the axial direction, wherein said piston assembly comprises a first piston head and a second piston head, the first piston head slidably received within the chamber of said casing, the second piston head slidably received within the additional chamber of said casing, the first and second piston heads coupled together such that the first and second piston heads slide simultaneously with the chamber and the additional chamber, respectively.

6. The linear compressor of claim 1, wherein said driving coil and said electro-magnetic spring are mounted to said casing.

7. The linear compressor of claim 1, further comprising at least one driving magnet mounted to said piston assembly and positioned proximate said driving coil, said at least one driving magnet spaced apart from said at least three spring magnets along the axial direction.

8. The linear compressor of claim 1, wherein said at least three spring magnets and the at least three ferromagnetic teeth of said electromagnetic spring are uniformly distributed along the axial direction.

9. A linear compressor, the linear compressor defining an axial direction and a radial direction, the linear compressor comprising:
a casing defining a chamber, the chamber of said casing extending longitudinally along the axial direction;
a piston assembly having a piston head, the piston head of said piston assembly slidably received within the chamber of said casing, said piston assembly slidable along the axial direction from a default position to a top dead center position and a bottom dead center position;

a driving coil positioned proximate said piston assembly, said driving coil configured for selectively urging said piston assembly to slide along the axial direction;

at least three spring magnets mounted to said casing, the spring magnets of said at least three spring magnets spaced apart from one another along the axial direction on said casing;

an electro-magnetic spring mounted to said piston assembly, said electro-magnetic spring comprising at least three ferromagnetic teeth, each ferromagnetic tooth of the at least three ferromagnetic teeth positioned proximate a respective one of said at least three spring magnets, each ferromagnetic tooth of said at least three ferromagnetic teeth facing and exposed to a respective spring magnet of said at least three spring magnets, said electro-magnetic spring urging said piston assembly towards the default position when said piston assembly is positioned away from the default position, each ferromagnetic tooth of the at least three ferromagnetic teeth radially aligned with the respective one of said at least three spring magnets when said piston assembly is positioned in the default position, each ferromagnetic tooth of the at least three ferromagnetic teeth radially misaligned with the respective one of said at least three spring magnets when said piston assembly is positioned in the top dead center position or the bottom dead center position.

10. The linear compressor of claim 9, wherein said electro-magnetic spring further comprises a spring coil positioned adjacent said at least three ferromagnetic teeth.

11. The linear compressor of claim 10, wherein the spring coil is configured for receiving an electrical current and adjusting a resonant frequency of said piston assembly.

12. The linear compressor of claim 9, wherein said at least three spring magnets generate a magnetic field that urges said piston assembly towards the default position when said piston assembly is positioned away from the default position.

13. The linear compressor of claim 9, wherein said casing defines an additional chamber that extends along the axial direction, wherein said piston assembly further comprises an additional piston head spaced apart from the piston head of said piston assembly along the axial direction, the additional piston head slidably received within the additional chamber of said casing, the piston head and the additional piston head coupled together such that the piston head and the additional piston head slide simultaneously with the chamber and the additional chamber, respectively.

14. The linear compressor of claim 9, wherein said driving coil is mounted to said casing.

15. The linear compressor of claim 9, further comprising at least one driving magnet mounted to said piston assembly and positioned proximate said driving coil, said at least one driving magnet spaced apart from said at least three spring magnets along the axial direction.

16. The linear compressor of claim 9, wherein said at least three spring magnets and the at least three ferromagnetic teeth of said electromagnetic spring are uniformly distributed along the axial direction.

* * * * *